United States Patent
Ueda et al.

(10) Patent No.: US 8,929,583 B2
(45) Date of Patent: Jan. 6, 2015

(54) MULTI-FUNCTION VIBRATION ACTUATOR (75) Inventors: Minoru Ueda, Tokyo (JP); Takayuki Kumagai, Tokyo (JP); Yuuichi Hashimoto, Tokyo (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 1228 days.

(21) Appl. No.: 12/525,229

(22) PCT Filed: Jan. 30, 2008

(86) PCT No.: PCT/JP2008/051400
§ 371 (c)(1),
(2), (4) Date: Nov. 12, 2009

(87) PCT Pub. No.: WO2008/093728
PCT Pub. Date: Aug. 7, 2008

(65) Prior Publication Data
US 2011/0051987 A1    Mar. 3, 2011

(30) Foreign Application Priority Data
Feb. 2, 2007 (JP) .................................. 2007-024688

(51) Int. Cl.
*H04R 25/00* (2006.01)
*B06B 1/04* (2006.01)
*H04M 19/04* (2006.01)
*H04R 9/06* (2006.01)

(52) U.S. Cl.
CPC ............... *B06B 1/045* (2013.01); *H04M 19/04* (2013.01); *H04R 9/06* (2013.01); *H04M 19/047* (2013.01); *H04R 2400/03* (2013.01); *H04R 2499/11* (2013.01)
USPC ............ 381/412; 381/386; 381/398; 381/424

(58) Field of Classification Search
CPC ........... H04R 2400/07; H04R 2400/01; H04R 2400/11; H04R 9/025; H04R 9/041
USPC .................. 381/412, 191, 398, 400, 420, 424
See application file for complete search history.

(56) References Cited

U.S. PATENT DOCUMENTS

| | | | |
|---|---|---|---|
| 6,570,993 B1 * | 5/2003 | Fukuyama | 381/396 |
| 2006/0153416 A1 * | 7/2006 | Kaneda et al. | 381/396 |
| 2007/0025585 A1 * | 2/2007 | Ikeda et al. | 381/403 |

* cited by examiner

*Primary Examiner* — Davetta W Goins
*Assistant Examiner* — Jasmine Pritchard
(74) *Attorney, Agent, or Firm* — Studebaker & Brackett PC (57) ABSTRACT

A multifunction oscillatory actuator which performs acoustic reproduction by an acoustic reproduction section includes a diaphragm having a voice coil attached thereto and performs the occurrence of somesthetic oscillation by a magnetic circuit section having a magnet attached thereto, and in which the acoustic reproduction section and the magnetic circuit section are attached to a housing having a cylindrical shape, such that the magnetic circuit section is supported on an inner wall of the housing by a frame-shaped suspension.

4 Claims, 10 Drawing Sheets

MULTI-FUNCTION VIBRATION ACTUATOR

TECHNICAL FIELD

The present invention relates to a multi-function vibration actuator capable of realizing both acoustic reproduction and the occurrence of somesthetic vibration by switching an input frequency to a voice coil.

BACKGROUND ART

Currently, a mobile communication apparatus such as a mobile telephone mainly includes a function of informing call incoming without using a ringing tone by the occurrence of somesthetic vibration as well as a function of informing call incoming using a ringing tone, and multi-function vibration actuators for applying these functions by a single device are used in a part of the models.

Among the above-described multi-function vibration actuators, as one of general structures, Japanese Patent No. 2929579 (hereinafter, referred to as Patent Document 1) is filed and registered, in which the shape of a suspension for supporting a magnetic circuit section having a magnet is partially changed so as to increase the linearity of the suspension, thereby obtaining good vibration characteristics.

In the multi-function vibration actuator described in Patent Document 1, since a planar shape is a rectangular shape, it is advantageous that a useless space on a mounting substrate upon mounting on a mobile telephone or the like is reduced.

In addition, in Japanese Unexamined Patent Application No. 2000-201396 (hereinafter, referred to as Patent Document 2), a planar shape is a track type such that it is possible to suppress a useless space on a mounting substrate while the area of a diaphragm is increased.

However, in the multi-function vibration actuators described in Patent Documents 1 and 2, each arm needs to be arranged along the outer circumference of a magnetic circuit supporting section due to the shape of the suspension, and a space in which the arm is arranged needs to be secured. Accordingly, it is difficult to reduce the arrangement space of the suspension.

In addition, by arranging the arm along the outer circumference of the magnetic circuit supporting section, since the vibration force works to a magnetic circuit section in a rotation direction when the magnetic circuit is driven, the amplitude of the magnetic circuit section may not be set large. Therefore, the vibration force which works to the inside of the suspension in a torsion direction may not be sufficiently used.

In addition, if the mounting space on the substrate is small, in the multi-function vibration actuator described in Patent Document 1, since the magnetic circuit is small, sufficient somesthetic vibration may not be obtained. In the multi-function vibration actuator described in Patent Document 2, the shape or the like of the suspension becomes complicated in order to suppress fluctuation of the magnetic circuit upon vibration.

SUMMARY OF THE INVENTION

The present invention is contrived to solve the above-described problems. An advantage of the present invention is to provide a multi-function vibration actuator which is simply configured into a rectangular shape and obtains stable vibration characteristics by a simple structure.

In order to solve the above-described problems, the invention described herein is characterized in that a magnetic circuit section is supported in a housing a frame-shaped suspension.

In more detail, the multi-function vibration actuator of the present invention does not use a suspension structure in which the magnetic circuit section is elastically supported by each arm extending independently, but uses a structure in which the magnetic circuit section is supported on the inner wall of the housing at frame-shaped sections.

Accordingly, it is possible to reduce the attachment area of suspension supporting sections and to increase the length of each arm occupied in the suspension compared with a conventional suspension for supporting the magnetic circuit section by each arm. Therefore, a force which operates to the inside of the suspension upon driving and a force in a bending direction along the arm can be received in a wider range of the suspension.

By using the frame shape, since stress applied to the above-described suspension is received in a range wider than that of the conventional technique, a structure which is tough against deformation is obtained and the suspension is hard to be deformed when impact is received upon dropping. In the conventional technique, it is possible to obtain stable vibration characteristics compared with the above-described structure in which the magnetic circuit section is supported by the arm.

The invention is further characterized in that the suspension supporting sections are symmetrically arranged when the frame-shaped suspension is supported. Therefore, it is possible to make a force applied to the suspension uniform.

With the invention described hereinabove, a magnetic circuit section is configured, and an inclined section is formed on a yoke for attaching the frame-shaped suspension. Therefore, it is possible to obtain a structure in which the suspension does not disturb the vibration of a magnetic circuit when the magnetic circuit section is driven.

By using the structure in which the inclined section is formed, it is possible to obtain the effect such as the distribution of impact upon dropping and the reduction of abnormal vibration upon the occurrence of somesthetic vibration. Accordingly, it is possible to add excellent resistance to impact and stable vibration characteristics.

The invention described herein is characterized in that, a through-hole is formed in a side surface of a cover attached to the housing. By using such a structure, the through-hole may be used as a fitted hole with the housing and a sound emitting hole. Therefore, it is possible to obtain two advantages including facilitation of assembling and improvement of acoustic characteristics.

The invention described herein is further characterized in that, the magnetic circuit section and the yoke or the cover are arranged to be close to each other. By using such a structure, air of two spaces between the diaphragm and the cover with the magnetic circuit section interposed therebetween and air between the diaphragm and the magnetic circuit section can be used as a damper.

As described above, by using the multi-function vibration actuator of the present invention, it is possible to provide a multi-function vibration actuator which is simply configured into a rectangular shape and obtains stable somesthetic vibration by a simple structure.

DETAILED DESCRIPTION OF THE INVENTION

Hereinafter, embodiments of the present invention will be described with reference to FIGS. 1 to 10.

Figure 1:
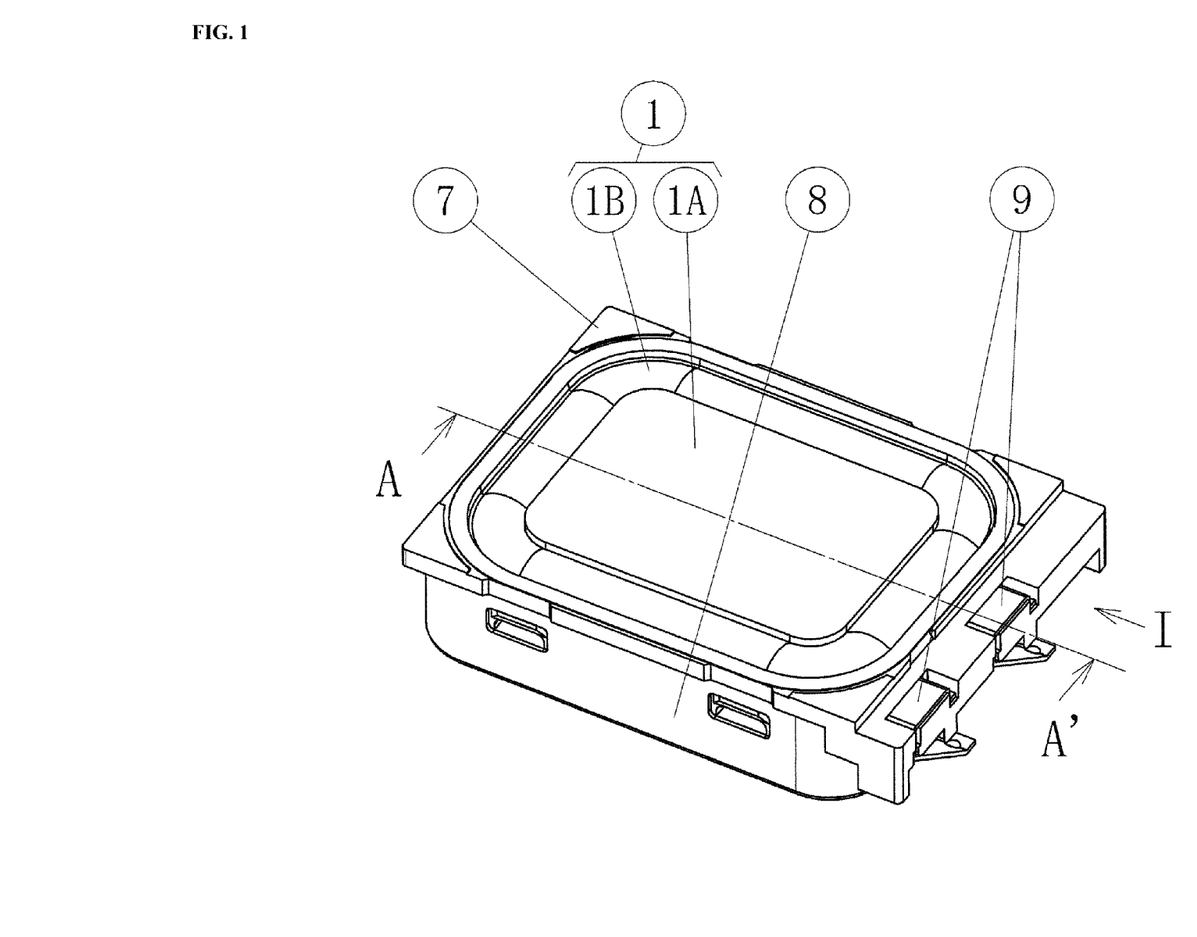
FIG. 1 is a perspective view of an embodiment of the present invention.
Figure 2:
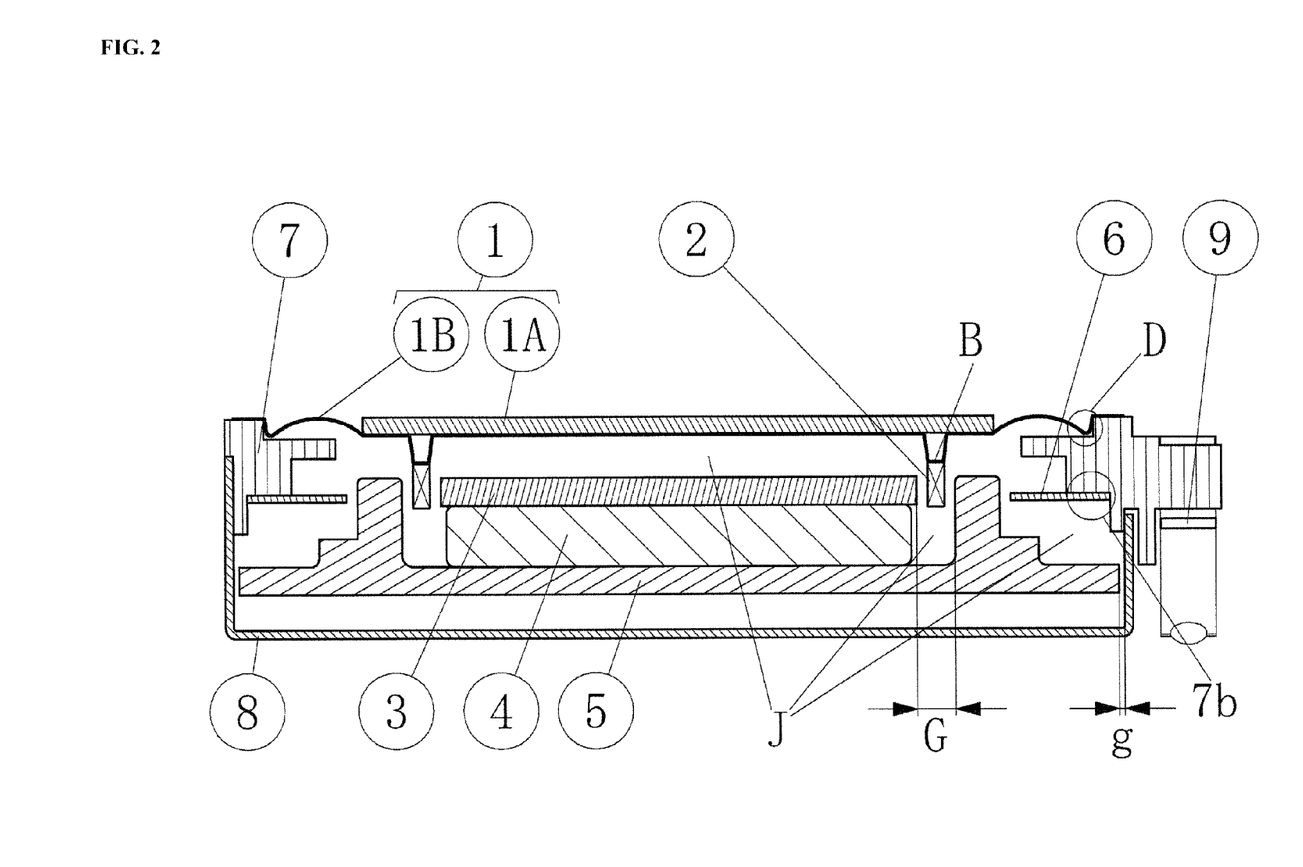
FIG. 2 is a side cross-sectional view taken along line A-A' of FIG. 1.

FIGS. 1 and 2 are a perspective view and a side cross-sectional view of a multi-function vibration actuator used in the present embodiment, respectively. FIG. 2 is a side cross-sectional view taken along line A-A' of the multi-function vibration actuator shown in FIG. 1.

Hereinafter, the driving structure of the multi-function vibration actuator according to the present embodiment will be described with reference to FIGS. 1 and 2. As can be seen from FIG. 2, in the multi-function vibration actuator according to the present embodiment, an acoustic reproduction section is configured by attaching a voice coil 2 wound on a diaphragm 1 including a diaphragm central section 1A and a diaphragm base section 1B in an oscillation vibration of the diaphragm 1.

In addition, a magnetic circuit section is configured by fixing a pole piece 3, which is formed of the same magnetic material as a magnet 4 magnetized in a vertical direction which is the vibration direction, to a concave section of a yoke 5 formed of a magnetic material, and a magnetic gap G in which the magnetic flux of the magnet 4 is concentrated is configured between the end of the pole piece 3 and the inner wall of the concave section of the yoke 5.

The multi-function vibration actuator according to the present embodiment uses a driving structure in which the voice coil 2 of the acoustic reproduction section is arranged in the magnetic gap G of the magnetic circuit section, the magnetic circuit section is supported on a housing 7 using a suspension 6, and an input frequency to the voice coil 2 is switched so as to vibrate the acoustic reproduction section or the magnetic circuit section.

Figure 3:
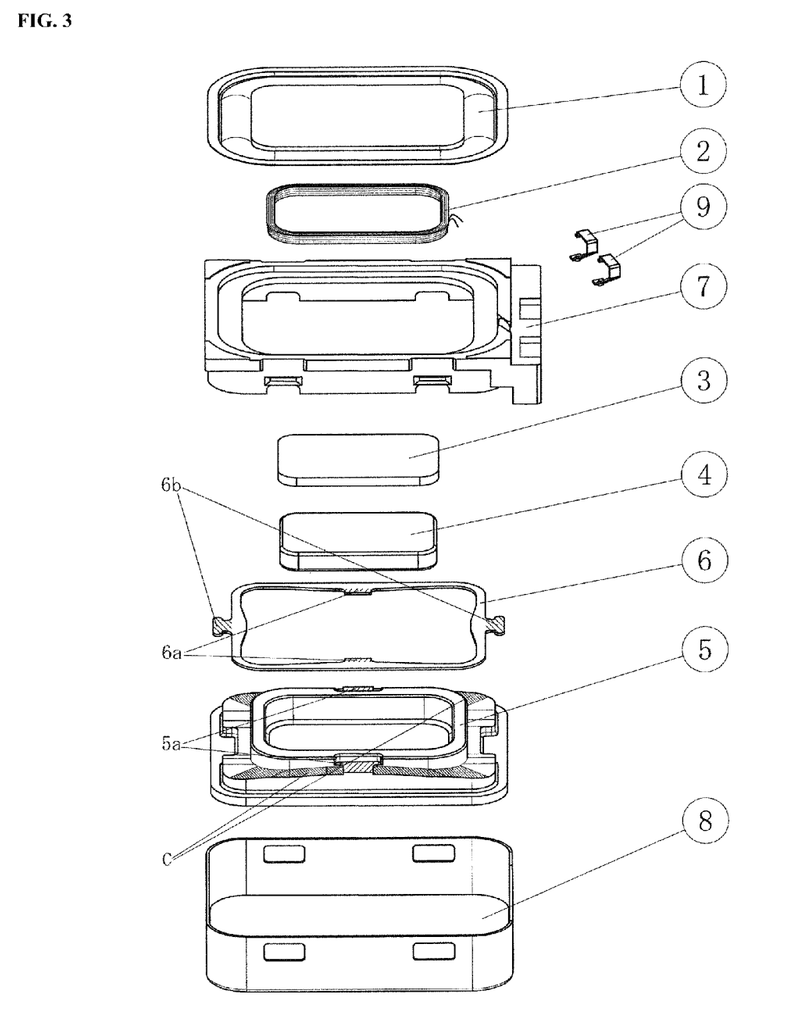
FIG. 3 is an exploded perspective view of the embodiment of the present invention.

FIG. 3 is an exploded perspective view of the multi-function vibration actuator according to the present embodiment. As can be seen from FIG. 3, in the present embodiment, the suspension 6 for supporting the magnetic circuit section uses a frame-shaped structure, two attaching sections 6a formed on the frame-shaped inside thereof are symmetrically attached to two attaching sections 5a formed on the magnetic circuit section, and attaching sections 6b formed on the outside thereof are symmetrically attached to separate attaching sections 7b of the housing 7 shown in FIG. 6, such that a restoration force which operates to the suspension 6 in a torsion direction is used when the magnetic circuit section is driven, thereby obtaining stable vibration characteristics.

In addition to the above-described effect, the suspension 6 is tough against deformation or the like due to the frame shape so as to solve a problem that a force which operates to the magnetic circuit section in a rotation direction upon driving in the conventional technique.

In addition, since the frame-shaped structure is used as the suspension, it is easy to configure the magnetic circuit section in a rectangular shape. By decreasing the area of the suspension, it is possible to increase the volume of the magnet and to improve a sound pressure level upon acoustic reproduction.

Figure 7:
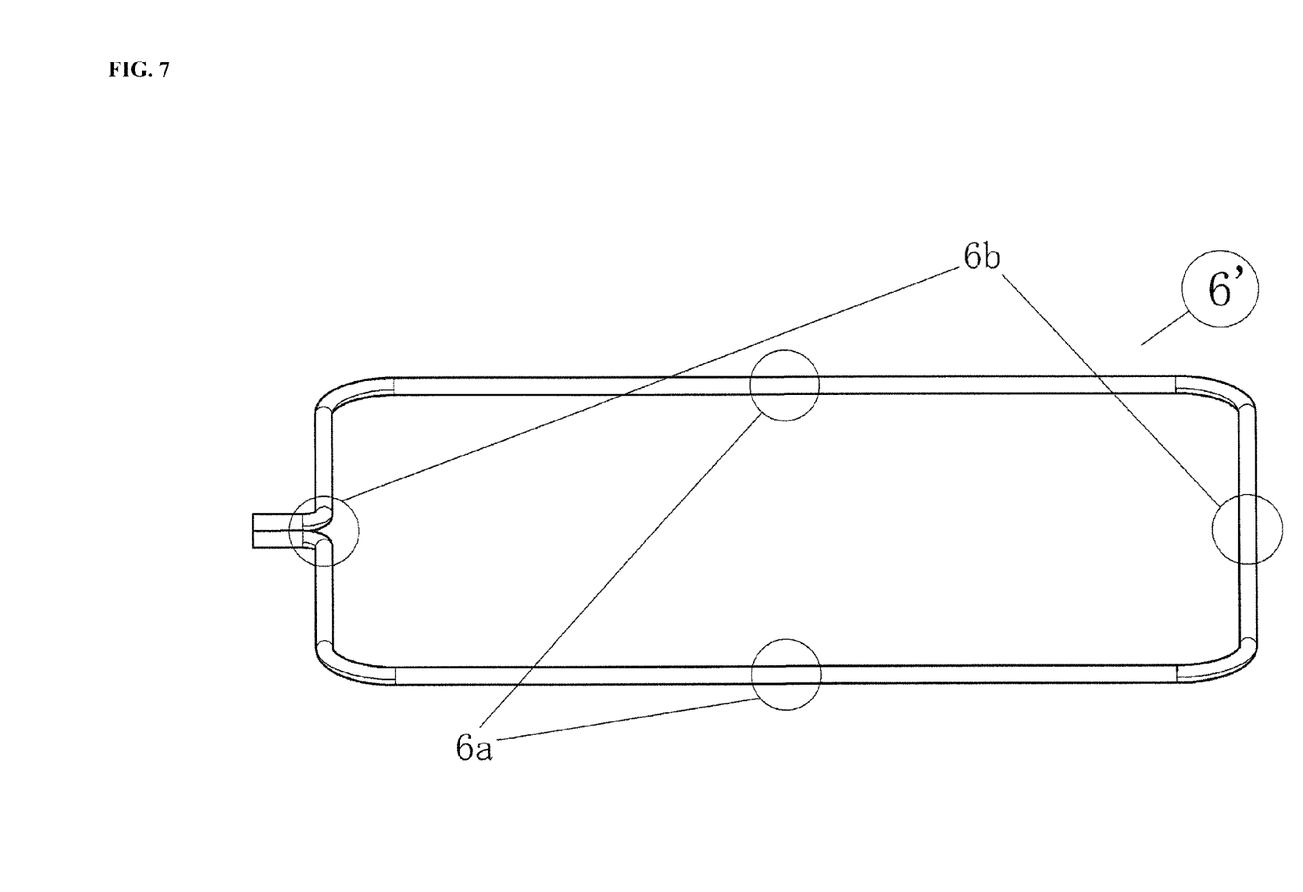
FIG. 7 is a view of a suspension configured using a linear material.
Figure 8:
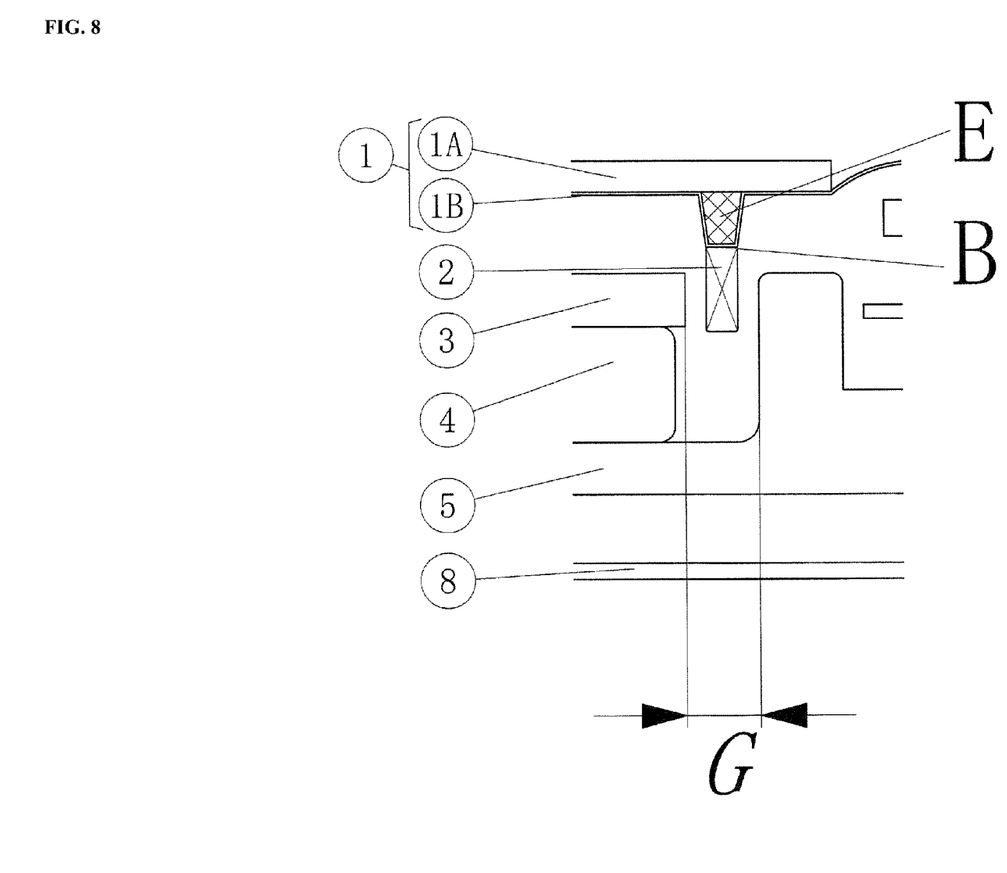
FIG. 8 is an enlarged cross-sectional of a coil attaching section.

In addition, from the same technical viewpoint as the above-described viewpoint, with respect to the suspension 6, a suspension 6' configured using a linear material shown in FIG. 7 may be used. In this case, with respect to the attaching sections, in order to support the same position as the suspension 6, the above-described attaching sections need to have a shape capable of fixing the linear material.

Figure 10:
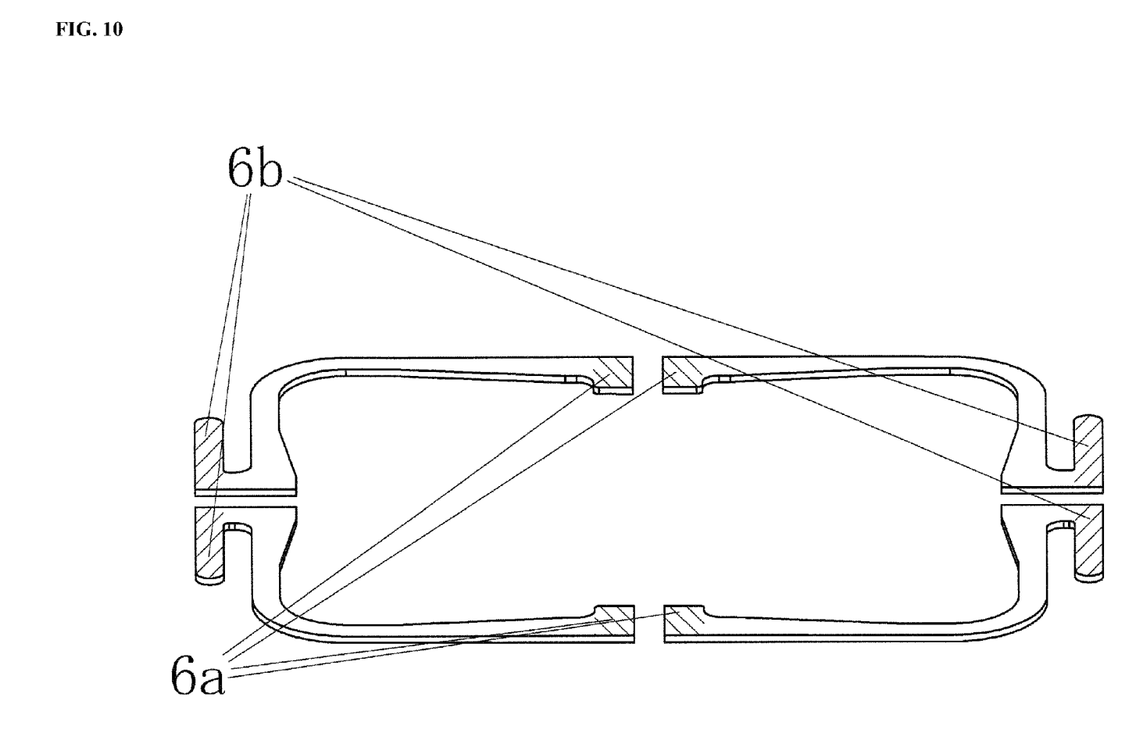
FIG. 10 is a perspective view when a frame-shaped suspension of the present embodiment is divisionally configured.

Although the suspensions 6 and 6' having the above-described frame shape are continuously molded in the present embodiment, the same effect is obtained even when a structure, in which the suspension is divisionally molded and is formed in a frame shape upon assembling, is used as shown in FIG. 10.

Although a plate-shaped suspension 6 is used in the present embodiment, if the suspension having the structure shown in FIG. 7 is used, it is possible to easily forming the suspension, to suppress the occupancy area of the suspension to be smaller than that of the case where the frame-shaped plate suspension is used, and to make the magnetic circuit section large.

As described above, in the present embodiment, with respect to the diaphragm 1, a two-body structure in which the diaphragm central section 1A is attached to the diaphragm base section 1B is used. Accordingly, an adhesion section B of the voice coil 2 is reinforced so as to improve a wideband limit frequency upon acoustic reproduction, and the total thickness of the multi-function vibration actuator can be reduced by configuring the diaphragm flat.

As can be seen from the side cross-sectional view of FIG. 2, in the present embodiment, with respect to the attaching sections to the housing 7 of the diaphragm 1, a structure in which a rising section D is formed and attached on the sidewall of the housing is used, such that the diameter of the diaphragm is secured and the diaphragm 1 is easily positioned.

Figure 4:
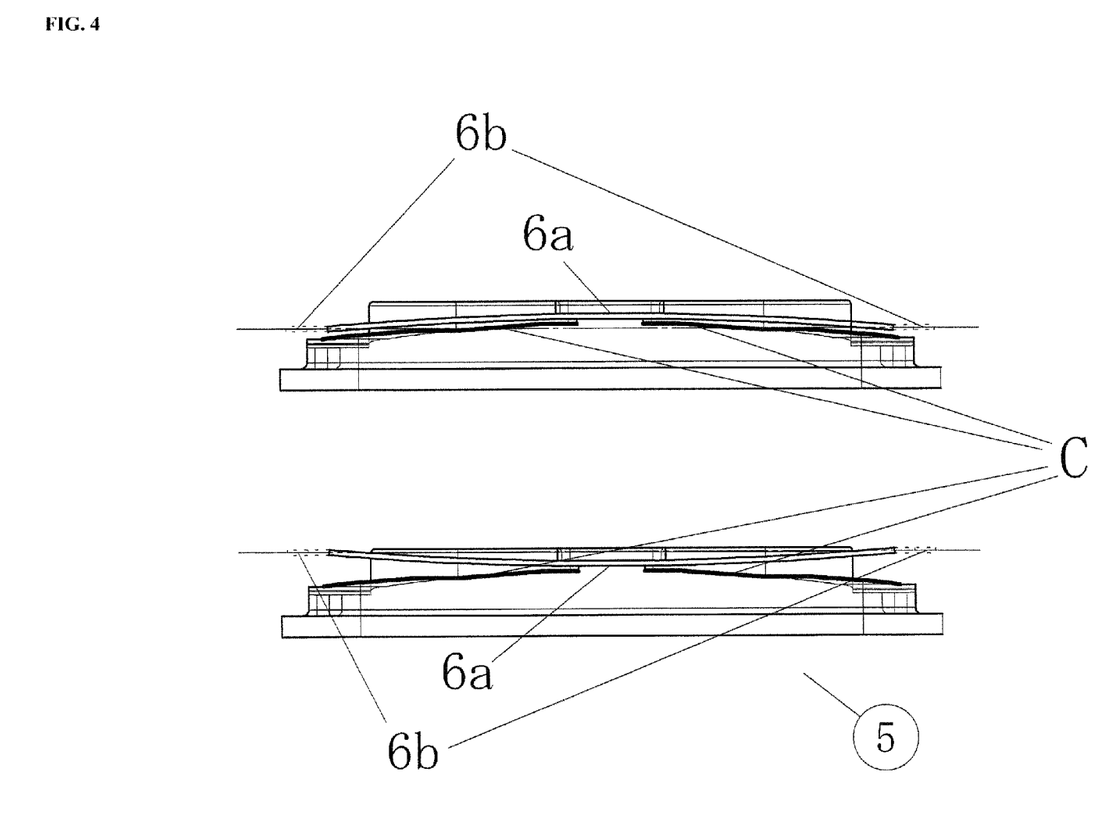
FIG. 4 is a side view of a yoke 5 of the embodiment of the present invention.
Figure 5:
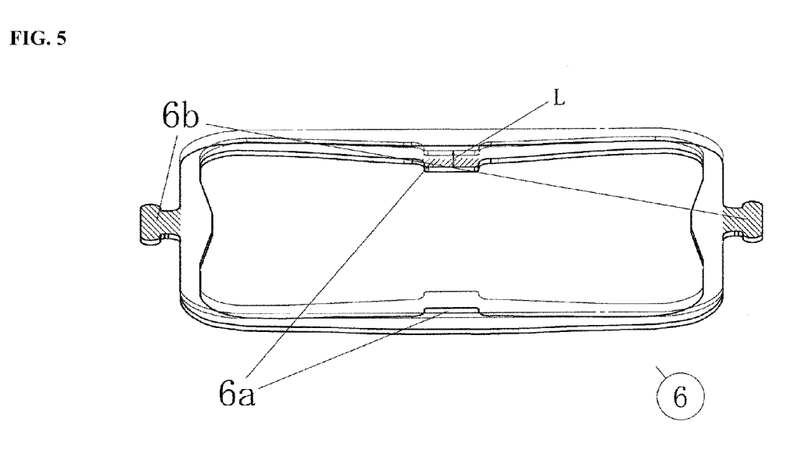
FIG. 5 is a perspective view of a suspension 6 deformed when a magnetic circuit section is driven, in the embodiment of the present invention.
Figure 6:
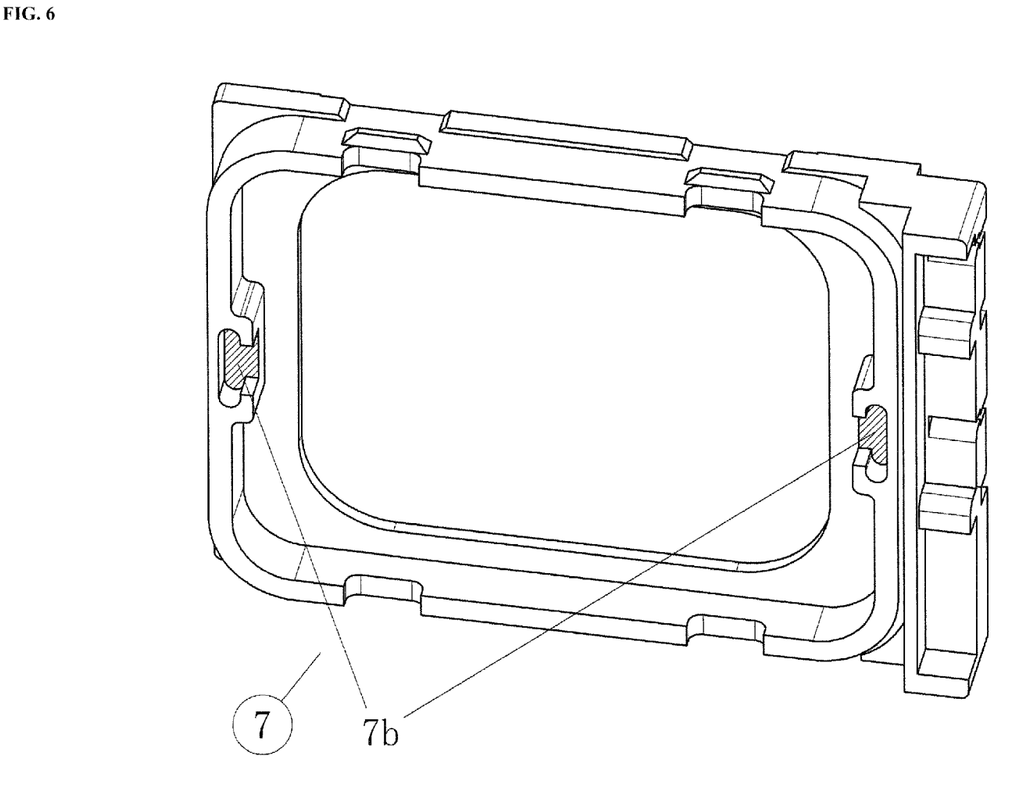
FIG. 6 is a view of a suspension attaching section of a housing 7.

As can be seen from the side view upon driving of the yoke 5 shown in FIG. 4 and the perspective view of the suspension 6 shown in FIG. 5, in the present embodiment, the magnetic circuit attached to the magnetic circuit attaching sections 6a vibrates using housing attaching sections 6b as a support point when the magnetic circuit section is driven, and the inclined section C is formed on the yoke 5 according to the deformation of the suspension 6 due to the amplitude L of the magnetic circuit section. Accordingly, it is possible to stabilize the vibration characteristics when the magnetic circuit is driven and to reduce impact when impact is received upon dropping.

As can be seen from the perspective view shown in FIG. 1 and the exploded perspective view shown in FIG. 3, in the present embodiment, a through-hole which functions as a fitted hole corresponding to an attaching claw formed on the side surface of the housing 7 and a sound emitting hole are formed in the sidewall of a cover 8 so as to facilitate assembling and improve acoustic characteristics.

The multi-function vibration actuator described in the present embodiment uses the structure in which the movement amount of air in upper and lower spaces with the yoke 5 sandwiched therebetween is restricted by narrowing the gap g between the yoke 5 and the cover 8 shown in the side cross-sectional view of FIG. 2 so as to obtain stable vibration characteristics using the air of the upper space J of the yoke 5 as a damper when the magnetic circuit section is driven.

In the present invention, the voice coil 2 wound in the rectangular shape is formed by compression after winding. Generally, if the voice coil is configured in the rectangular shape, the strength after winding is reduced compared with the case where the voice coil is wound in a circular shape. In addition, since it is difficult to apply tension to a straight line portion of the rectangular shape upon winding, the straight line portion is formed in a shape which swells outside.

In the present embodiment, it is possible to solve the problems of the conventional technique by forming the voice coil 2 by compression after winding so as to have the rectangular shape and to increase the space factor of the voice coil 2 so as to improve an acoustic level upon acoustic reproduction.

As can be seen from the side cross-sectional view of FIG. 2, in the present embodiment, the diaphragm 1 uses the two-body structure including the diaphragm base section 1B and the central section 1A. Accordingly, as shown in the enlarged cross-sectional view of FIG. 8, an adhesive or the like is filled in a gap E between the coil adhesion section B and the diaphragm central section 1A so as to increase the rigidity of the coil adhesion section B, thereby improving the acoustic characteristics in a wideband.

Figure 9:
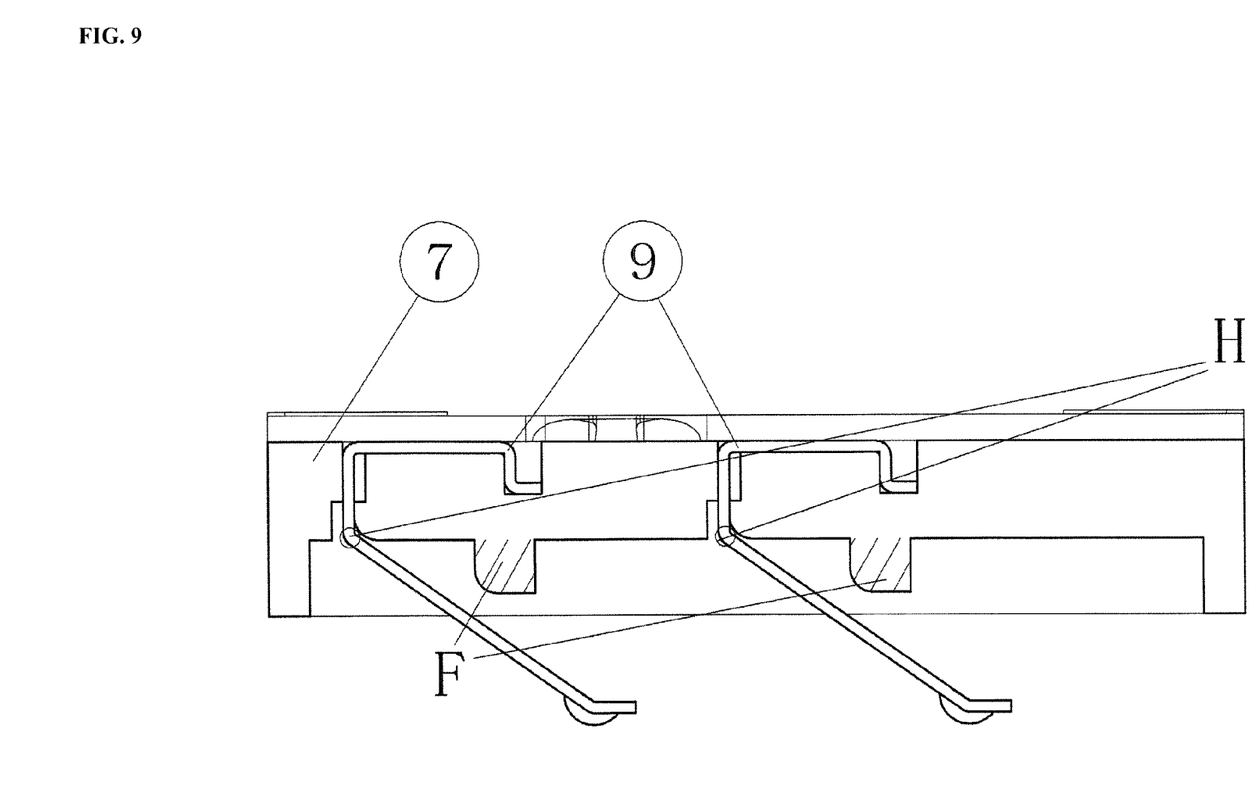
FIG. 9 is a side view of terminals when viewed in an I direction of FIG. 1.

In addition to the above-described effects, as can be seen from the side view of FIG. 9 when viewed in an I direction of FIG. 1, terminals 9 are attached in the same direction in parallel. Accordingly, when attaching the multi-function vibration actuator, it is possible to reduce an attachment area and to reduce the total height of a device.

In addition, since a structure in which an intermediate point between contact points of the substrates of the terminals 9 is supported by a convex section F is used, contact pressure to the substrates of the terminals 9 is improved without deforming the shape of the terminals and loads concentrated on bending sections H of the terminals 9 upon contact can be distributed.

As described above, by using the multi-function vibration actuator described in the present embodiment, it is possible to provide a multi-function vibration actuator which is simply configured into a rectangular shape and obtains stable somesthetic vibration by a simple structure.

This application is based on International Application No. PCT/JP2008/051400, filed Jan. 30, 2008 which is based on Japanese Patent Application No. 2007-024688 filed Feb. 2, 2007, the contents of each being hereby incorporated herein by reference.

What is claimed is:

1. A multifunction oscillatory actuator for acoustic reproduction, comprising:
   an acoustic reproduction section including a diaphragm having a voice coil attached thereto;
   a magnetic circuit section having a magnet attached thereto, the magnetic circuit section is adapted to produce somesthetic oscillation;
   a rectangular-shape housing having an inner wall;
   the acoustic reproduction section and the magnetic circuit section are attached to the rectangular-shape housing such that the magnetic circuit section is supported on the inner wall of the rectangular-shape housing by a frame-shaped suspension having four connected sides disposed on substantially a same plane to form the frame shape; and two magnetic attaching sections symmetrically formed on two opposite sides of the frame-shaped suspension so as to attach the suspension to two corresponding suspension attaching sections formed on the magnetic circuit section, and housing attaching sections symmetrically formed on other two opposite sides of the frame-shaped suspension so as to attach the suspension to two corresponding suspension attaching sections of the rectangular-shape housing.

2. The multifunction oscillatory actuator according to claim 1, wherein
   the magnetic circuit section has a structure in which the magnet is plate-shaped and magnetized in an oscillation direction and is sandwiched between a plate-shaped pole piece and a cup-shaped yoke, both of the plate-shaped pole piece and the cup-shaped yoke are formed of a magnetic material, and
   an inclined section is formed on an outer circumference of the yoke for fixing a portion of the frame-shaped suspension.

3. The multifunction oscillatory actuator according to claim 1, wherein a through-hole is formed in a side surface of a cover, the through-hole is formed on a side opposite to the diaphragm with a side surface of the rectangular-shape housing or the magnetic circuit section of the housing interposed therebetween.

4. The multifunction oscillatory actuator according to claim 1, wherein a flow rate of air in a side surface of the magnetic circuit section is restricted by reducing a distance between the side surface of the magnetic circuit section and a cover or the inner wall of the rectangular-shape housing.

* * * * *